United States Patent
Wong

(10) Patent No.: US 9,586,088 B2
(45) Date of Patent: Mar. 7, 2017

(54) ABDOMEN EXERCISER

(71) Applicant: Shenzhen Kangruide Biotechnology Co., Ltd., Shenzhen (CN)

(72) Inventor: Ka Leung Wong, Hong Kong (CN)

(73) Assignee: SHENZHEN KANGRUIDE BIOTECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 14/827,448

(22) Filed: Aug. 17, 2015

(65) Prior Publication Data
US 2016/0045782 A1  Feb. 18, 2016

(30) Foreign Application Priority Data

Aug. 18, 2014  (CN) .................... 2014 2 0464835 U

(51) Int. Cl.
| | |
|---|---|
| A63B 21/00 | (2006.01) |
| A63B 23/02 | (2006.01) |
| B32B 27/00 | (2006.01) |
| A63B 22/20 | (2006.01) |
| A63B 23/035 | (2006.01) |
| A63B 71/00 | (2006.01) |

(52) U.S. Cl.
CPC ...... *A63B 23/0211* (2013.01); *A63B 21/4035* (2015.10); *A63B 22/20* (2013.01); *A63B 23/03516* (2013.01); *B32B 27/00* (2013.01); *A63B 21/00069* (2013.01); *A63B 2071/0063* (2013.01); *A63B 2208/0214* (2013.01); *A63B 2209/00* (2013.01); *A63B 2225/09* (2013.01); *B32B 2307/50* (2013.01); *B32B 2307/744* (2013.01)

(58) Field of Classification Search
CPC ... A63B 22/20–22/208; A63B 23/1236; A63B 23/0211; A63B 21/0004; A63B 21/072–21/075; A63B 23/0205–23/0227; A63B 21/4033–21/4035; A63B 21/4043; A63B 2225/09; A61H 15/00; A61H 15/0092; A61H 2015/0007–2015/005; B60B 27/065; B60B 35/14
USPC .... 482/132; 601/118, 120, 129, 19, 94, 128, 601/131; 301/128, 111.01, 111.03, 301/111.04
See application file for complete search history.

(56) References Cited

U.S. PATENT DOCUMENTS

| | | | | |
|---|---|---|---|---|
| 1,358,092 | A | * | 11/1920 | Millard ................ B60B 35/025 301/132 |
| 3,403,906 | A | * | 10/1968 | Burzenski ............. A63B 22/20 482/108 |
| 4,185,375 | A | * | 1/1980 | Brown .................. A63B 49/08 206/303 |

(Continued)

*Primary Examiner* — Loan H Thanh
*Assistant Examiner* — Gregory Winter

(57) ABSTRACT

An abdomen exerciser includes a connecting element, a first roller, a second roller and a holding component. The connecting element includes two connectors and two roller bearings, each connector has a receiving groove, a plurality of locating pores and a plurality of limiting slots. The connectors are connected with the first roller and the second roller respectively. The holding component is received in the receiving grooves. The holding component includes a plurality of ball bearings and a plurality of limiting elements, the ball bearings are locked in the locating pores, the limiting elements are received in the limiting slots.

5 Claims, 6 Drawing Sheets

(56) References Cited

U.S. PATENT DOCUMENTS

| | | | | |
|---|---|---|---|---|
| 6,328,680 B1* | 12/2001 | Shifferaw | ........... | A63B 21/0618 |
| | | | | 482/127 |
| 6,511,386 B1* | 1/2003 | Cacicedo | ................. | B25G 1/01 |
| | | | | 473/300 |
| 6,837,837 B2* | 1/2005 | Nethery | ............. | A63B 21/0004 |
| | | | | 482/114 |
| 8,672,815 B1* | 3/2014 | Springer | ............ | A63B 21/0724 |
| | | | | 482/106 |
| 2006/0110716 A1* | 5/2006 | Micari | ................... | A63B 69/18 |
| | | | | 434/253 |
| 2012/0040811 A1* | 2/2012 | DeTore | ............ | A63B 21/00047 |
| | | | | 482/141 |
| 2012/0264578 A1* | 10/2012 | Frederick | ........... | A63B 21/0004 |
| | | | | 482/132 |
| 2013/0017936 A1* | 1/2013 | Olson | ................ | A63B 21/0004 |
| | | | | 482/132 |
| 2014/0358050 A1* | 12/2014 | Stock | ................. | A61H 15/0092 |
| | | | | 601/119 |
| 2015/0328491 A1* | 11/2015 | Miller | ............. | A63B 21/00185 |
| | | | | 482/82 |

\* cited by examiner

ABDOMEN EXERCISER

CROSS REFERENCE TO RELATED APPLICATIONS

This application claims priority to Chinese Patent Application CN 201420464835.8, filed on Aug. 18, 2014, the above application is hereby incorporated by reference herein as if set forth in its entirety.

BACKGROUND

1. Technical Field

The present disclosure generally relates to an abdomen exerciser, and especially to an abdomen exerciser with adjustable rollers distance.

2. Description of Related Art

Traditional abdomen exerciser only has one roller and two holding elements positioned on the two opposite sides of the roller. It is hard to control the stability of the rolling movement when using the traditional abdomen exerciser, and thus users may give up the exercise easily.

Some other kinds of abdomen exercisers have two rollers. However, the distance between the two rollers cannot be adjusted, that is, the distance between the two rollers is fixed. As people have different shoulder-width and strength, the abdomen exerciser with a fixed distance between the two rollers cannot satisfy users demand.

Therefore, a need exists in the industry to overcome the described problems.

SUMMARY

The disclosure is to offer an abdomen exerciser, especially to an abdomen exerciser with adjustable roller distance.

An abdomen exerciser includes a connecting element, a first roller, a second roller and a holding component. The connecting element includes two connectors and a roller bearing, each connector has a receiving groove, a plurality of locating pores and a plurality of limiting slots. The first roller and the second are connected with the two connectors respectively. The holding component is received in the receiving grooves. The holding component includes a plurality of ball bearings and a plurality of limiting elements, the ball bearings are locked in the fixing pores, the limiting elements are received in the limiting slots.

Preferably, the connectors pass through the first roller and the second roller respectively, and the connectors are connected with the first roller and the second roller through roller bearings.

Preferably, the locating pores are formed on two opposite sides of each connectors, the locating pores are symmetrically arrayed at ends of the holding component.

Preferably, the limiting slots are formed on the two opposite sides of each connector.

Preferably, the abdomen exerciser has three working states including a closure state, a first exercise state and a second exercise state.

Preferably, the distance between the first roller and the second roller during the closure state, the first exercise state and the second exercise state are 0 cm, 2.54 cm and 5.04 cm respectively.

Preferably, the first roller and the second roller both include an outer housing, an inner housing and a friction tread to be fitted onto the outer housing, the outer housing and the inner housing are connected through screw, a surface of each friction tread has anti-slippery element, the anti-slippery elements are made of rubber and have anti-slippery pattern.

Preferably, the abdomen exerciser further includes two handles, the handles are fitted onto the end portions of the connectors exposed from the first roller and the second roller.

Preferably, the handles are made of latex, a surface of each handle has anti-slippery pattern, and the handles are ergonomically designed.

It follows that, the distance between the first roller and the second roller can be easily adjusted through the connecting and holding components according to user's need, so it is easy to control the stability of the rolling movement when using the abdomen exerciser.

Furthermore, the anti-slippery elements on the friction tread can reduce the vibration and noise.

Furthermore, the holding elements are ergonomically designed. The ergonomic design can effectively reduce the discomfort of hands of user caused by long time exercising, such that the abdomen exerciser could provide user a comfortable exercise experience.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
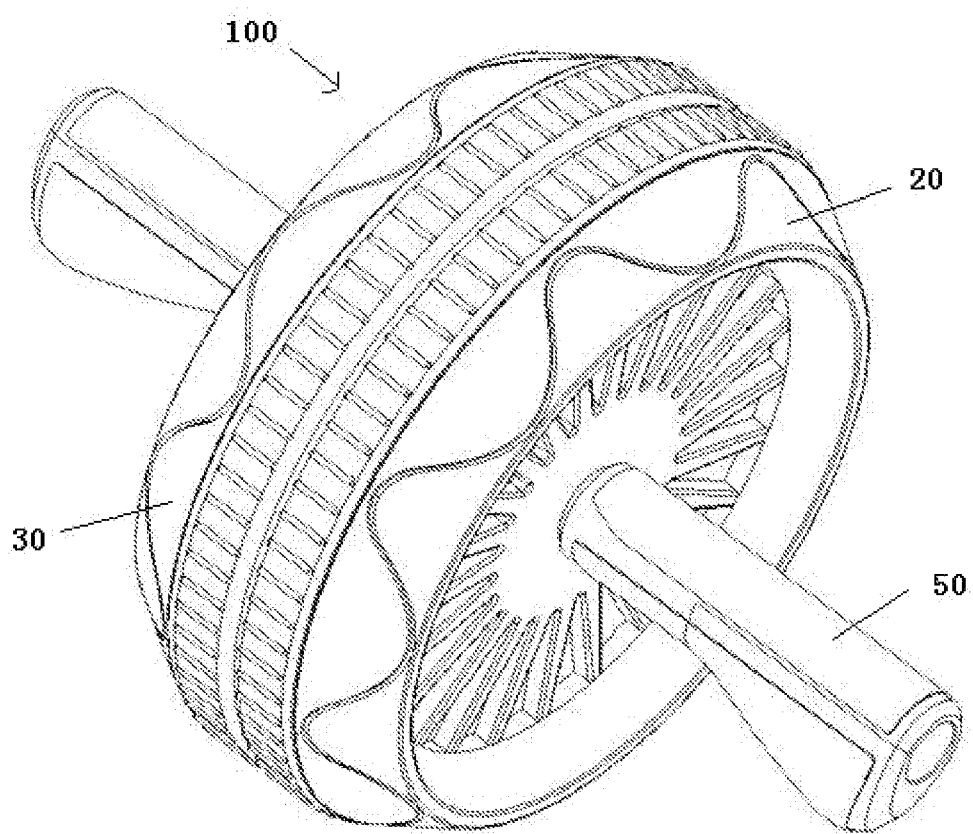
FIG. 1 is an isometric view of an abdomen exerciser according to an exemplary embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
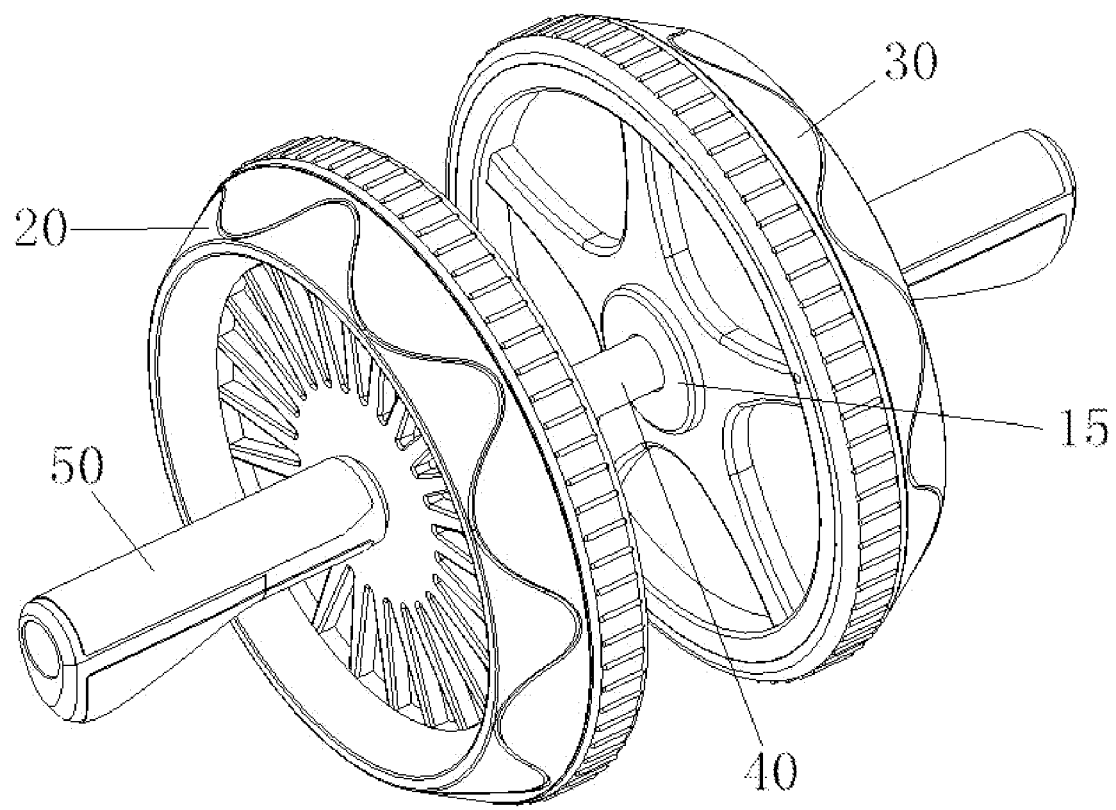
FIG. 2 is an isometric view of an abdomen exerciser during a exercise state according to an exemplary embodiment.
Figure 3:
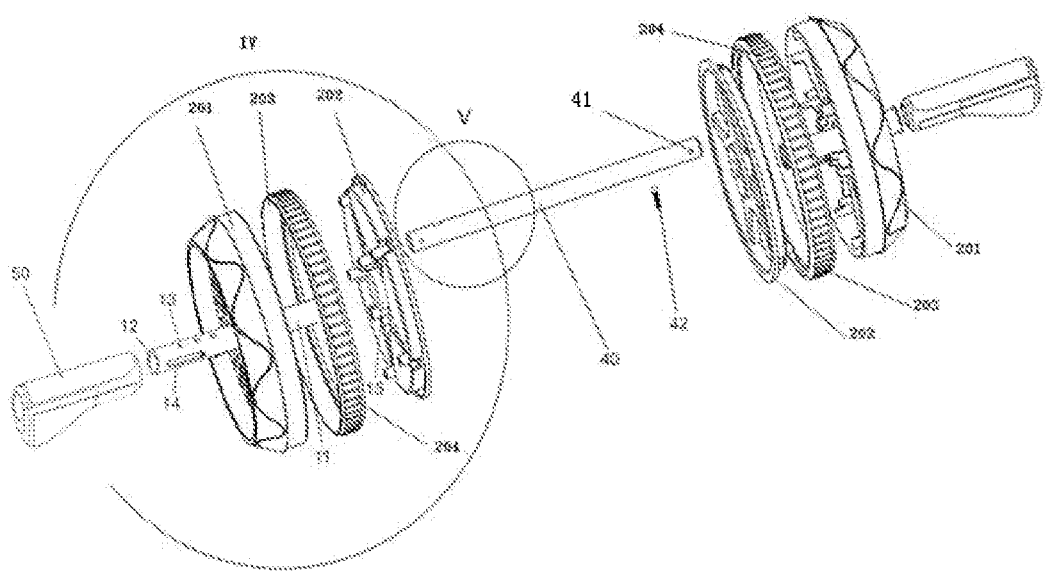
FIG. 3 is an exploded isometric view of the abdomen exerciser shown in FIG. 1.
Figure 4:
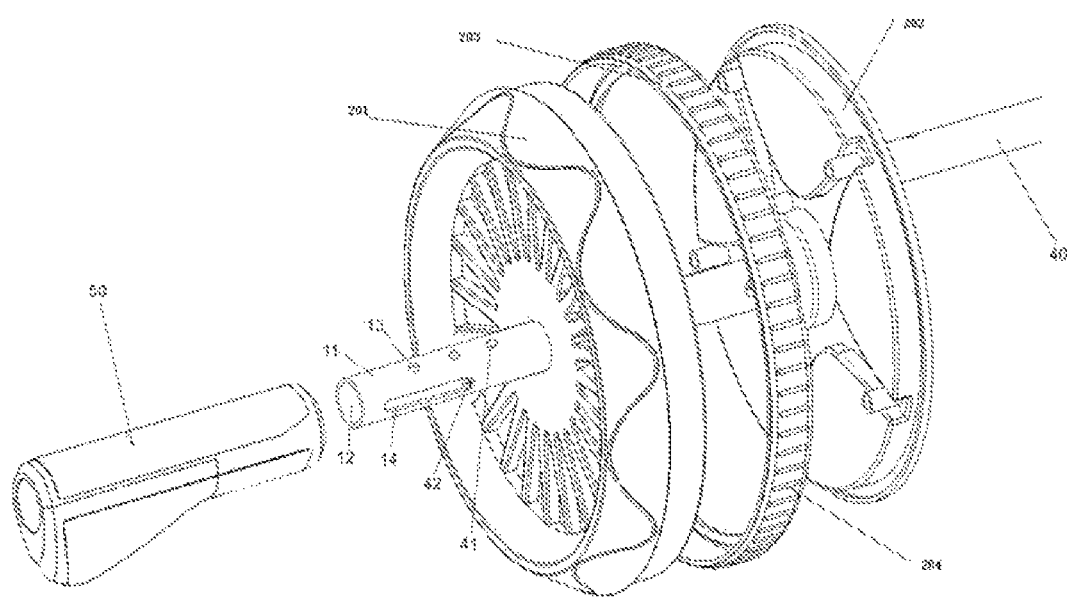
FIG. 4 is an enlarged, isometric view of a circled portion IV shown in FIG. 3
Figure 5:
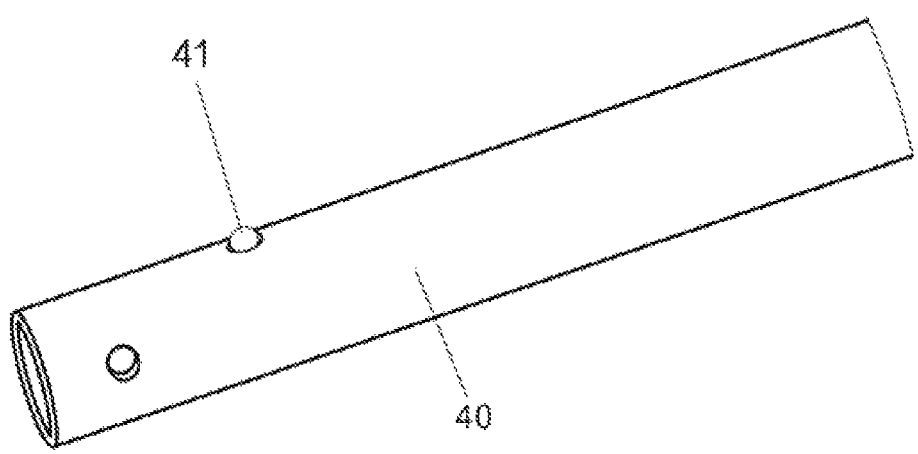
FIG. 5 is an enlarged view of a circled portion V shown in FIG. 3
Figure 6:
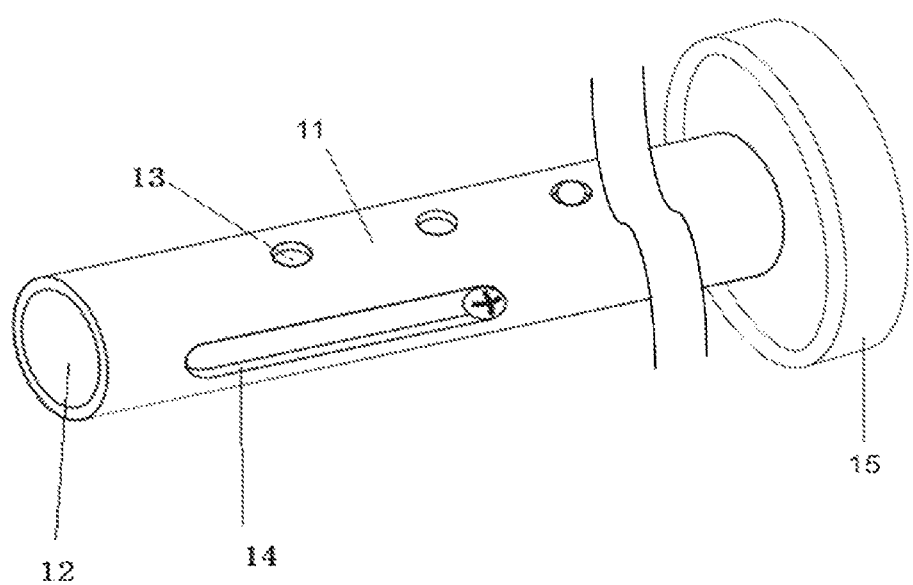
FIG. 6 is an isometric view of the connecting element.

With reference to FIGS. 1-6, the abdomen exerciser 100 includes a connecting element 10, a first roller 20, a second roller 30, a holding component 40 and two handles 50.

The connecting element 10 can include two connectors 11 and two roller bearings 15. The connecting element 10 can pass through the middle of the first roller 20 and the second roller 30 respectively. In at least one exemplary embodiment, the connectors 11 can be connected with the first roller 20 and the second roller 30 through roller bearings 15, such that the rolling movement of the first roller 20 and the second roller 30 will not be affected by the connectors 11 or handles 50, after they are force-fitted onto the connectors 11.

Each connector 11 has a receiving groove 12, a plurality of locating pores 13 and a plurality of limiting slots 14.

The receiving grooves 12 can cut through the corresponding connectors 11, such that each connector 11 can have a hollow structure. The holding component 40 can be received in the receiving grooves 12, such that the first roller 20 and the second roller 30 can be connected through the connecting element 10 and the holding component 40.

In at least one exemplary embodiment, the number of the locating pores 13 can be twelve, each connector 11 can have six locating pores 13, and the locating pores 13 can be formed on the two opposite sides of each connector 11. The locating pores 13 located at the two opposite connectors 11 are symmetrically arrayed at the ends of the holding component 40.

In at least one exemplary embodiment, the number of the limiting slots 14 can be four, each connector 11 can have two opposite limiting slots 14.

The first roller 20 and the second roller 30 both includes an outer housing 201, an inner housing 202 and a friction tread 203 to be fitted onto the outer housing 201. The outer housing 201 and the inner housing 202 could be connected through screw (not shown). A surface of each friction tread 203 can directly contact with ground, and the surface of the friction tread 203 has anti-slippery element 204. The friction tread 203 and its associated anti-slippery elements 204 can be made of rubber and have anti-slippery pattern. The anti-slippery elements 204 also can reduce the vibration and noise when the abdomen exerciser 100 is being used.

The holding component 40 includes two ball bearings 41 and two limiting elements 42.

The two ball bearings 41 can be formed on the two opposite ends of the holding component 40. The ball bearings 41 can be locked by the locating pores 13 respectively. When the ball bearings 41 are pressed, the ball bearings 41 can move downward until the ball bearing 41 passes the inner surface of the connectors 11. When the force put on the ball bearings 41 is released, the ball bearings 41 can move upward to a natural state and be locked in the locating pores 13.

The limiting elements 42 can be screws, the limiting elements 42 can be received and moved in the limiting slots 14. The length and direction of the limiting slots 14 can affect the movement of the connecting component 10 and the distance between the first roller 20 and the second roller 30.

The handles 50 can be made of latex. The two handles 50 can be fitted onto the end portions of two connectors 11 exposed from the first roller 20 and the second roller 30. A surface of each handle 50 has anti-slippery pattern, and the handles 50 are ergonomically designed. The ergonomic design could effectively reduce the discomfort of the hands of the user caused by long time exercising, such that the abdomen exerciser 100 could provide user a comfortable exercising experience.

When user pushes the handles 50, the ball bearings 41 are pressed by the rim of the locating pores 13 and move downward until the ball bearings 41 passes the inner surface of the connecting element 10, the ball bearing 41 keep moving toward the middle of the holding component 40, when the ball bearings 41 come to another corresponding locating pores 13, the force pressing the ball bearing is released, such that the ball bearings 41 can move upward and be locked in the corresponding locating pores 13, such that the distance between the first roller 20 and the second roller 30 can be reduced according to user's need.

When user pulls the handles 50, the ball bearings 41 are pressed and move downward until the ball bearings 41 passes the inner surface of the connecting element 10, the ball bearing 41 keep moving away from the middle of the holding component 40, when the ball bearings 41 come to another corresponding locating pores 13, the force pressing the ball bearing is released, such that the ball bearings 41 can move upward and be locked in the corresponding locating pores 13, such that the distance between the first roller 20 and the second roller 30 can be increased according to user's need.

In at least one exemplary embodiment, the abdomen exerciser 100 three working states including a closure state, a first exercise state and a second exercise state. The distance between the first roller 20 and the second roller 30 during the closure state, the first exercise state and the second exercise state can be about 0 cm, 2.54 cm or 5.04 cm respectively.

When the abdomen exerciser 100 is in a closure state, the distance between the first roller 20 and the second roller 30 can be about 0 cm. That is, the first roller 20 is in contact with the second roller 30. At this time, the two ball bearings 41 are received in the two locating pores 13 furthest to the middle of the holding component 40.

When the abdomen exerciser 100 is in a first exercise state, the distance between the first roller 20 and the second roller 30 can be about 2.54 cm. At this time, the two ball bearings 41 are received in two locating pores 13, and the two locating pores 13 during the second exercise state can be located between the two locating pores 13 closest to the middle of the holding component 40 and the locating pores 13 furthest to the middle of the holding component 40.

When the abdomen exerciser 100 is in a second exercise state, the distance between the first roller 20 and the second roller 30 can be about 5.04 cm. At this time, the two ball bearings 41 are received in two locating pores 13 closest to the middle of the holding component 40.

It is to be understood that, the abdomen exerciser 100 can have the other exercise states, such as the fourth exercise state, the fifth exercise state, and so on. The abdomen exerciser 100 during the fourth exercise state, the fifth exercise state can have different rollers distance.

When mounting the abdomen exerciser 100, the holding component 40 can be received in the connecting element 10, the limiting elements 42 can be received in the limiting slots 14, and the ball bearings 41 can be received in the locating pores 13. Then the two connectors 11 can be connected with the first roller 20 and the second roller 30 respectively through roller bearings 15. Finally, the handles 50 can be fitted onto the end portions of two connectors 11 exposed from the first roller 20 and the second roller 30.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:
1. An abdomen exerciser comprising:
a connecting element including two connectors, each connector having a receiving groove, a plurality of locating pores and a plurality of limiting slots;
a first roller;
a second roller, the two connectors being connected with the first roller and the second roller respectively; and
a holding component received in the receiving grooves, the holding component including a plurality of ball bearings and a plurality of limiting elements, the ball bearings being locked in the locating pores, the limiting elements being received in the limiting slots;

wherein the abdomen exerciser has three working states including a closure state, a first exercise state and a second exercise state, and wherein a distance between the first roller and the second roller during the closure state, the first exercise state and the second exercise state are 0 cm, 2.54 cm and 5.04 cm respectively.

2. The abdomen exerciser of claim 1, wherein each connector has two opposite limiting slots.

3. The abdomen exerciser of claim 1, wherein the first roller and the second roller both include an outer housing, an inner housing and a friction tread to be fitted onto the outer housing, the outer housing and the inner housing are connected through a screw, a surface of each friction tread has anti-slippery elements, the anti-slippery elements are made of rubber and have an anti-slippery pattern.

4. The abdomen exerciser of claim 1, wherein the abdomen exerciser further includes two handles, the handles are fitted onto end portions of the connectors exposed from the first roller and the second roller.

5. The abdomen exerciser of claim 4, wherein the handles are made of latex, a surface of each handle has an anti-slippery pattern, and the handles are ergonomically designed.

* * * * *